Jan. 2, 1951     W. M. SAIDEL     2,536,773
SELF-SEALING CONTAINER OF LAMINATED
PLASTIC SHEET MATERIAL
Filed Jan. 19, 1950
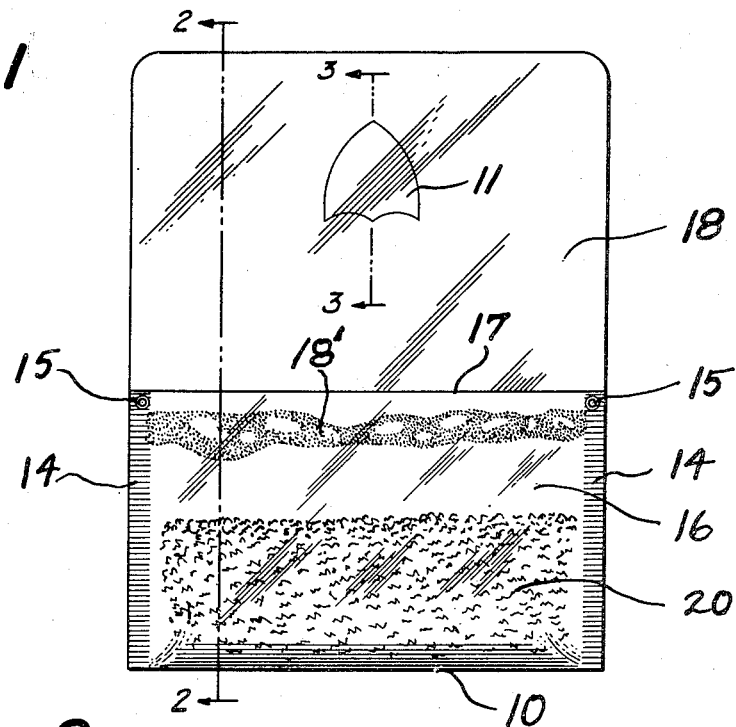
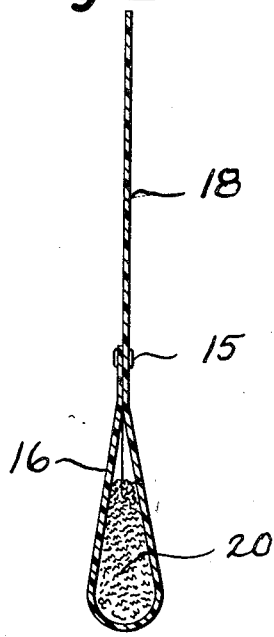
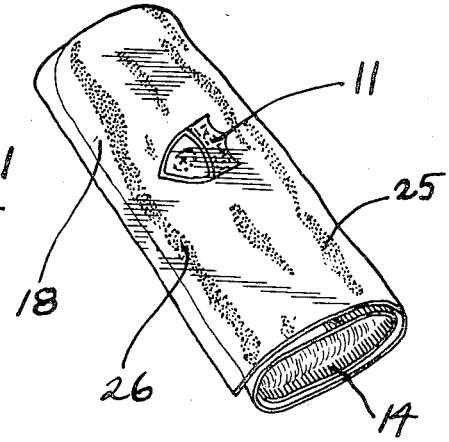
INVENTOR.
Willard M. Saidel
BY
Joseph Rossman Patented Jan. 2, 1951

2,536,773

UNITED STATES PATENT OFFICE 2,536,773

SELF-SEALING CONTAINER OF LAMINATED PLASTIC SHEET MATERIAL

Willard M. Saidel, Plainfield, N. J.

Application January 19, 1950, Serial No. 139,351

6 Claims. (Cl. 206—41)

This invention relates to a reclosable self-sealing container made of normally pressure-sensitive self-sealing material. More specifically, the invention relates to a container made of highly plasticized flexible vinyl resin sheet material which is normally pressure-sensitive and self-sealing when contiguous surfaces are juxtaposed and pressed together whereby the container may be resealed after opening same by application of mere manual pressure thereto at its open portions.

Containers made according to my invention may be made of any suitable size and shape depending upon the article desired to be packaged. An illustrative embodiment of my invention is shown in the appended drawings wherein Figure 1 is a plan view of a tobacco pouch having its flap in unfolded extended position, Figure 2 is a sectional view taken on lines 2—2 of Figure 3, Figure 3 is an enlarged sectional view taken on lines 3—3 of Figure 1, and Figure 4 is a perspective view of the pouch shown in Figure 1 in sealed condition having the flap rolled up.

Referring to the drawings, Figure 1 shows a pouch suitable for packaging tobacco and which can be opened and resealed by the user during use by mere pressure of the fingers at the open mouth thereof. The pouch is preferably made of a single blank of flexible transparent highly plasticized sheet material of vinyl resin containing at least 25% by weight of plasticizer so as to have sufficient pressure-sensitive properties to permit resealing the mouth of the pouch by merely applying pressure thereto by means of the fingers. The sheet material is preferably made of polymerized vinyl chloride or copolymers of vinyl chloride with vinyl esters, vinyl acetate and vinylidene chloride. I may also use flexible highly plasticized sheets of polyvinyl acetal resins and highly plasticized sheets of polyvinyl butyral resins. It is essential to incorporate 25 to 50% by weight of a suitable plasticizer in the vinyl resin sheet material so that it has sufficient pressure-sensitive properties at ordinary room temperatures to permit the sheet to be self-sealing by merely applying pressure with the fingers to overlapping contacting surfaces of the sheet material. Suitable plasticizers for such purpose are tributyl phosphate, triphenyl phosphate, tricresyl phosphate, dibutyl phthalate, di- and triglycerol esters, moncresyl dibenzyl phosphate, triethylene glycol di(2-ethyl butyrate), ethylhexyl phthalate, butoxyglycol, di-2-ethyl hexyl phthalate and the like. I may use vinyl resin sheets having a thickness of 0.004 to 0.012 inch thickness or more for making my containers. Such sheets should preferably be pressure-polished on both sides so as to have perfectly smooth plane surfaces and should also preferably be perfectly transparent so that the contents in the package may be visible. However, if desired, suitable pigments may be incorporated in the resin sheets to produce colored and opaque containers. The vinyl resin sheets may also be printed or ornamented in any suitable manner if desired.

I have found it advantageous to utilize calendered plasticized vinyl resin sheets such as sold by Bakelite Corp. under the trade-mark "Vinylite VU-1900" in 8 or 12 gauge thickness. Such sheets contain about 35% by weight of plasticizer. They are translucent in appearance and have a slightly rough surface. When it is desired to have an ornamental design or indicia appear on the container, I may apply a suitable decalcomania to a single vinyl resin sheet 5 as shown in Figure 3. After the decalcomania is suitably applied and dried or aged, I superpose a second sheet 6 of vinyl resin and place the assembly between polished platens of a press and subject same to a pressure of about 100 lbs./in.² and a temperature of about 350° F. for about 3 to 4 minutes. The assembly is then cooled while under pressure. Under these conditions the vinyl resin sheets unite or coalesce into an integral clear transparent sheet, the surfaces of which are pressure-sensitive when overlapped into face contact and pressed together with the fingers. In order to reduce the pressure-sensitive characteristics, I may apply a light film of talc suspended in mineral oil to the surface of the sheet material.

Instead of interposing a suitable decalcomania between the sheets I may interpose any transparent relatively thin base sheet, such as cellophane, rubber hydrochloride film or Pliofilm, ethyl cellulose, cellulose acetate and the like carrying suitable designs or indicia thereon. These interposed base sheets of suitable shape and area are embedded between the adjacent superposed plies during the laminating operation and their surfaces carrying the indicia are protected against abrasion or wear since they are not exposed.

The sheet material made as previously described is then cut into a blank of suitable dimensions and contour. When making a tobacco pouch, for example, a rectangular blank is provided having the insignia 11 positioned adjacent one end thereof. The other end of the blank is folded back on itself along a transverse line 10 and the opposed longitudinal marginal portions 14 are subjected to suitable heat and pressure to coalesce or weld the superposed layers of the blank at the marginal portions to form a permanent strong seam. Such seams may be made by using any suitable press or by radio frequency heating units. I may also form the seams by applying to the marginal portions suitable cements or solvents, such as acetone, cyclohexanone, methyl ethyl-ketone to which a small amount of plasticizer such as tricresyl phosphate or dibutyl phthalate may be added. In order to reinforce and strengthen the same I may provide eyelets 15 at the upper end of each side seam, as shown in Figure 1, in order to resist tearing of the seam when the pouch is used.

By virtue of the formation of the opposed side seams 14, a pocket portion 16 is provided having a mouth portion 17. Tobacco or any other article 20 desired to be packaged is then placed in the pocket portion 16. Pressure is then applied manually to the pocket portion along a line 18' adjacent the mouth 17 to seal the pocket. The application of mere manual pressure is sufficient to provide a good seal which can be readily opened by merely pulling upon the edge 17 of the pocket when it is desired to remove the entire contents or a portion of the contents. The user can readily reseal the pocket after removing a part of the contents and preserving the remainder by merely applying pressure with the fingers along a line 18' adjacent the mouth of the pocket. The pocket can be opened and resealed indefinitely without tearing or impairing the walls of the pocket. After sealing the mouth the elongated closing flap 18 is folded over the front face of the pocket portion and is wrapped around the body thereof as shown in Figure 4. Upon applying pressure with the fingers to such areas at 25 and 26 of the flap, an additional seal is provided because the contiguous surface portions of the sheet material of the container being pressure-sensitive will readily adhere together but can be readily separated by merely pulling them apart. Packages provided in accordance with my invention are therefore hermetically sealed at all times prior or during use.

Although the foregoing specific embodiment relates to a tobacco pouch it is to be understood that my invention is adapted for making containers for packaging any kind of articles or commodities. The container may be made of any suitable dimensions and shape depending upon the article which is to be packaged. The container may be of any desired construction and may be made of a single blank suitably cut or of a plurality of separate portions suitably joined or united together. The specific pouch construction previously described may also be modified in many ways if desired. For example, gussets or bellows edge folds may be provided at the outer edges and seams of the pocket portion to permit expansion of the pocket portion. The pocket portion may also be provided with spaced narrow seams extending longitudinally so as to form a plurality of spaced pocket portions for receiving and retaining articles therein such as cigars and the like.

Obviously, the container of the present invention is possessed of many advantages. The vinyl resin sheet material being gasproof, moisture-proof and waterproof provides complete protection to the contents which are hermetically sealed as previously explained. It may be used directly as the sales container and, after the sale, it serves as a convenient pouch for both using the tobacco and maintaining it at the proper moisture content, being of a size sufficiently small to be carried in the pocket. With respect to its use as a sales container, the pouch is particularly attractive by reason of the transparent and clear character of the material employed, thus enabling the contents to be inspected without damage or harm. The insignia embedded between the laminated sheets is visible at all times and will not be defaced or wear off because it is protected by the outer sheet. Attractive permanent designs and trade-marks can thus be readily provided in the container. If desired, portions or all of the container may be rendered opaque and of different colors to render the appearance of the package more colorful and attractive.

In addition to its utility as above pointed out, the material employed is of a nature that is not responsive to temperature changes, and the material remains flexible without cracking at substantially all temperatures experienced under normal weather conditions.

While the present invention has been described with some degree of exactness and detail, it is to be understood that the invention is not limited to such detail, but inasmuch as certain changes may be made in the above article and different embodiments of the invention could be made without departing from the scope thereof, it will thus be seen that the objects hereinbefore set forth may readily and efficiently be attained and since certain changes may be made in the container and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A reclosable self-sealing container made of a single blank of coalesced laminated heat and pressure welded highly plasticized flexible vinyl resin sheet material, said sheet material having perfectly smooth plane pressure-polished surfaces and being self-sealing when superposed in face contact under manual pressure and manually separable, said blank being folded on itself and sealed along the superposed margins to form a pocket portion and an integral elongated closing flap extending beyond the mouth of the pocket, a decalcomania interposed between the lamina, said pocket being adapted to be superficially sealed only by manual pressure along a line adjacent the mouth thereof and being reclosable after the seal has been broken by applying only manual pressure along a line adjacent the mouth of the pocket.

2. A reclosable self-sealing container made of a single blank of laminated heat and pressure welded highly plasticized flexible vinyl resin sheet material, said sheet material having perfectly smooth plane pressure-polished surfaces and being self-sealing when superposed in face contact under manual pressure and manually separable, said blank being folded on itself and sealed along the superposed margins to form a pocket portion and an integral elongated closing flap extending beyond the mouth of the pocket, a relatively thin transparent sheet material bearing insignia thereon interposed between the lamina, said pocket being adapted to be superficially sealed only by manual pressure along a line adjacent the mouth thereof and being reclosable after the seal has been broken by applying only manual pressure along a line adjacent the mouth of the pocket.

3. A blank made of superposed coalesced layers of flexible pressure-sensitive plasticized polyvinyl resin sheet material containing 25 to 50% by weight of plasticizer integrally united by heat and pressure, said sheet material having perfectly smooth plane pressure-polished surfaces and being self-sealing when superposed in face contact under manual pressure and manually separable, and having a transparent base sheet carrying indicia thereon interposed between two of said sheets and embedded therein.

4. A blank made of superposed coalesced layers of flexible pressure-sensitive plasticized polyvinyl resin sheet material containing 25 to 50% by weight of plasticizer integrally united by heat and pressure, said sheet material having perfectly smooth plane pressure-polished surfaces and being self-sealing when superposed in face contact under manual pressure and manually separable, and having a decalcomania interposed between two of said sheets and embedded therein.

5. The method of making container blanks having pressure-sensitive and self-sealing characteristics which comprises superposing a plurality of plasticized polyvinyl resin sheets containing 25 to 50% by weight of plasticizer, interposing a transparent sheet carrying indicia thereon between two of said superposed sheets, applying heat and pressure to unite said sheets together and cooling said united sheets while under pressure to produce perfectly smooth plane pressure-polished surfaces on said sheets and being self-sealing when superposed in face contact under manual pressure and manually separable.

6. The method of making container blanks having pressure-sensitive and self-sealing characteristics which comprises superposing a plurality of plasticized polyvinyl resin sheets containing 25 to 50% by weight of plasticizer, interposing a decalcomania between two of said superposed sheets, applying heat and pressure to unite said sheets together and cooling said united sheets while under pressure to produce perfectly smooth plane pressure-polished surfaces on said sheets and being self-sealing when superposed in face contact under manual pressure and manually separable.

WILLARD M. SAIDEL.

REFERENCES CITED

The following references are of record in the file of this patent:

UNITED STATES PATENTS

| Number | Name | Date |
|---|---|---|
| 1,992,152 | Yeates | Feb. 19, 1935 |
| 2,289,618 | Young | July 14, 1942 |
| 2,344,369 | Salfisberg | Mar. 14, 1944 |
| 2,373,285 | Baer | Apr. 10, 1945 |
| 2,435,464 | Radcliffe | Feb. 3, 1948 |
| 2,514,185 | Eberly | July 4, 1950 |

FOREIGN PATENTS

| Number | Country | Date |
|---|---|---|
| 533,814 | Great Britain | Feb. 20, 1941 |